US008790553B2

(12) United States Patent
Lopes et al.

(10) Patent No.: US 8,790,553 B2
(45) Date of Patent: Jul. 29, 2014

(54) ELECTRICAL EQUIPMENT CONTAINING ERUCIC ACID DIELECTRIC OIL

(75) Inventors: Jose Humberto Lopes, Ribeirao (BR); David V. Mahoney, Austin, TX (US); Rafael Garcia-Ramirez, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 100 days.

(21) Appl. No.: 13/382,416

(22) PCT Filed: Jul. 2, 2010

(86) PCT No.: PCT/US2010/040881
§ 371 (c)(1), (2), (4) Date: Feb. 22, 2012

(87) PCT Pub. No.: WO2011/005675
PCT Pub. Date: Jan. 13, 2011

(65) Prior Publication Data

US 2012/0139681 A1 Jun. 7, 2012

Related U.S. Application Data

(60) Provisional application No. 61/223,656, filed on Jul. 7, 2009.

(51) Int. Cl.
*C09K 5/00* (2006.01)
*H01B 3/22* (2006.01)

(52) U.S. Cl.
CPC .......................................... *H01B 3/22* (2013.01)
USPC .......................................... 252/571; 252/572

(58) Field of Classification Search
None
See application file for complete search history.

(56) References Cited

U.S. PATENT DOCUMENTS

| | | | |
|---|---|---|---|
| 2,628,939 | A | 2/1953 | Blake |
| 3,551,324 | A | 12/1970 | Lillard |
| 5,736,915 | A | 4/1998 | Goedde |
| 5,766,517 | A | 6/1998 | Goedde |
| 6,037,537 | A | 3/2000 | McShane |
| 6,184,459 | B1 | 2/2001 | McShane |
| 6,280,659 | B1 | 8/2001 | Sundin |
| 6,352,655 | B1 | 3/2002 | McShane |
| 6,398,986 | B1 | 6/2002 | McShane |
| 6,485,659 | B1 | 11/2002 | Goedde |
| 6,613,250 | B2 | 9/2003 | McShane |
| 6,726,857 | B2 | 4/2004 | Goedde |
| 6,905,638 | B2 | 6/2005 | Corkran |
| 7,651,641 | B2 | 1/2010 | Corkran |
| 7,871,546 | B2 | 1/2011 | Corkran |
| 2002/0109128 | A1 | 8/2002 | McShane et al. |
| 2008/0033201 | A1 | 2/2008 | Hof |
| 2008/0283803 | A1 * | 11/2008 | Rapp et al. .................... 252/578 |

FOREIGN PATENT DOCUMENTS

| | | | |
|---|---|---|---|
| CA | 2786816 | | 11/2008 |
| JP | 2000-090740 | | 3/2000 |
| RU | 2251170 | C2 | 4/2005 |
| RU | 2337421 | C1 | 10/2008 |
| WO | WO 00/11682 | | 3/2000 |
| WO | WO 2006/074553 | | 7/2006 |
| WO | WO 2007/041785 | | 4/2007 |

OTHER PUBLICATIONS

Wang, "Introduction and Utilization of High Erucic Acid Oil Plant Crambe Abyssinica", Chinese Bulletin of Botany, 1998, 15 (3), p. 23-28.

Deng, Dinghui, "Development and Utilization of Higher, Lower Erucic Acid Rapeseed Oil", Development of Agricultural and Animal Products Journal, May 31, 1997, p. 16-17.

Babu et al., "Room-Temperature Transesterification of Edible and Nonedible Oils Using a Heterogeneous Strong Basic Mg/La Catalyst", Energy & Fuels, 2008, 22, p. 1965-1971.

Badent et al., "Inhibited rape-seed oil as substitute for mineral oils", IEEE 2002 Annual Report Conference on Electrical Insulation and Dielectric Phenomena, 2002, p. 268-271.

Bansal et al., "Dielectric properties of different varieties of rapeseed-mustard oil at different temperatures", Indian Journal of Pure and Applied Physics, 39(8), p. 532-540.

Carlson et al., "Crambe: New Crop Success", 1996, p. 306-322, URL: http://www.hort.purdue.edu/newcrop/proceedings1996/v3-306.html.

"Crambe, Industrial Rapeseed, and Tung Provide Valuable Oils", ERS/USDA publications, 1996, URL: http://www.ers.usda.gov/publications/ius6/ius6c.pdf.

"Defraplast: New plasticisers and stabilisers from UK-grown crambe oil", Department for Environment, Food and Rural Affairs (DEFRA), 2006, URL: http://randd.defra.gov.uk/Document.aspx?Document=NF0615_5388_FRA.pdf.

Hemmer et al., "Electrical properties of vegetable oil-impregnated paper insulation", IEEE 2003 Annual Report Conference on Electrical Insulation and Dielectric Phenomena, 2003, p. 60-63.

Leonard, E.Charles, "High-erucic vegetable oils", Industrial Crops and Products, 1 (1993) 119-123.

Lewand, Lance R., "Natural Ester Dielectric Liquids", NETA World Technical Journal, No. Fall. (2004), pp. 1-4.

(Continued)

*Primary Examiner* — Necholus Ogden, Jr.
(74) *Attorney, Agent, or Firm* — Gregg H. Rosenblatt

(57) ABSTRACT

The present invention relates to a composition suitable for use in electrical equipment containing a dielectric fluid including an oil component, the oil component including one or both of crambe oil and high erucic acid rapeseed oil and one or both of esterified crambe oil and esterified high erucic acid rapeseed oil.

18 Claims, No Drawings

(56) References Cited

OTHER PUBLICATIONS

Li et al., "Transesterification of soybean oil to biodiesel with Zn/I2 catalyst", Catalysis Letters, vol. 107, Nos. 1-2, Feb. 2006, p. 25-30.
McShane et al., "Fire Resistant Natural Ester Dielectric Fluid and Novel Insulation System for Its Use", IEEE 1999 Transmission and Distribution Conference, Apr. 1999.
McShane et al., "New Safety Dielectric Coolants for Distribution and Power Transformers", IEEE Industry Applications Magazine, May/Jun. 2000, p. 24-32.
McShane, "Vegetable-Oil-Based Dielectric Coolants", IEEE Industry Applications Magazine, May/Jun. 2002, vol. 8, Issue 3, p. 34-41.
Nieschlag, H.J., "Industrial Uses of High Erucic Oils", Journal of the American Oil Chemists Society, 1971, vol. 48, No. 11, p. 723-727.
Oommen et al., "A New Vegetable Oil Based Transformer Fluid: Development and Verification", IEEE 2000 Conference on Electrical Insulation and Dielectric Phenomena, p. 308-312.
Oommen, T.V., "Vegetable Oils for Liquid-Filled Transformers", IEEE Electrical Insulation Magazine, p. 1-11.
Scaif, WG, "The natural electrical conductivity of organic liquids subjected to hydrostatic pressures", J. Phys. D: Appl. Phys., vol. 7, 1974, p. 647-652.
Schuchardt et al., "Alkylguanidines as catalysts for the transesterification of rapeseed oil", Journal of Molecular Catalysis A: Chemical, 99(1995), p. 65-70.
Sell et al., "Crambe as a Specialty Crop in North Dakota", Agricultural Economics Report No. 286, May 1992.
Sundin, David, "Fluid Choices in Retrofilling PCB Transformers", IEEE 1992 International Symposium on Electrical Insulation, Jun. 7-10, 1992, p. 445-447.
Tao et al., "Enzymatic Isolation and Enrichment of Erucic Acid from HEA Seed Oils: Current Status", Transaction of the ASAE, vol. 48(4), p. 1471-1479.
Veseth, Roger, "New Rapeseed Varieties to Expand PNW Market Potential", PNW Conservation Tillage Handbook Series, Chapter 8—Crops and Varieties, No. 2, Jun.-Jul. 1985, URL: http://pnwsteep.wsu.edu/tillagehandbook/chapter8/080285.htm.
Weber et al., "Natural and Synthetic Ester Dielectric Fluids and Novel Insulation System for Their Use", presented to Edison Electric Institute Distribution Conference, Oct. 6, 1998.
Yan et al., "Biodiesel Production by Simultaneous Transesterification and Esterification", AIChE Meeting presentation, Nov. 20, 2008.
Zeng et al., "Activation of Mg—Al hydrotalcite catalysts for transesterification of rape oil", Fuel, 87(2008), p. 3071-3076.
Decision of Grant, Corresponding Russian Patent Application No. 2012102081.

* cited by examiner

ELECTRICAL EQUIPMENT CONTAINING ERUCIC ACID DIELECTRIC OIL

CROSS REFERENCE TO RELATED APPLICATIONS

This application is a national stage filing under 35 U.S.C. 371 of PCT/US2010/040881, filed Jul. 2, 2010, which claims priority to U.S. Application No. 61/223,656, filed Jul. 7, 2009, the disclosure of which is incorporated by reference in its/their entirety herein.

TECHNICAL FIELD

This invention relates to electrical equipment containing dielectric oil having a high erucic acid content.

BACKGROUND

Dielectric (or insulating) fluids used in electrical distribution and power equipment—including transformers, switching gear and electric cables—perform two important functions. These fluids act as an electrical insulating medium, i.e., exhibit dielectric strength, and they transport generated heat away from the equipment, i.e., act as a cooling medium. When used in a transformer, for example, dielectric fluids transport heat from the windings and core of the transformer or connected circuits to cooling surfaces. Apart from possessing dielectric strength and cooling capacity, an ideal dielectric fluid for electrical equipment also exhibits little or no detrimental impact on the environment, is compatible with materials used to construct the equipment, and is relatively nonflammable.

For more than a century, mineral oils derived from crude petroleum were used extensively as insulating and cooling liquids in electrical equipment. Though such oils possess a satisfactory dielectric strength and are compatible with equipment materials, they are not considered nonflammable, and, because they are petroleum-based, they are considered to carry with them an environmental cost. In the middle part of this century, as safety standards became more demanding for many indoor and vault equipment installations, mineral oils were replaced to a large extent by nonflammable liquids such as polychlorinated biphenyl (PCB) fluids. PCBs eventually were recognized for their environmental hazards, and as a result the production and sale of PCBs as well as their use in new equipment was banned.

Because of the disadvantages and shortcomings of PCB-based fluids and because of the increasing sensitivity to the potential adverse environmental impact of mineral oils and available alternatives, there have been and continue to be numerous efforts undertaken to develop relatively inexpensive, environmentally safe, and nonflammable dielectric fluids.

Due to an increasing awareness and sensitivity toward environmental concerns, it has become increasingly desirable to provide a dielectric fluid that: (1) poses minimal environmental hazards; (2) degrades quickly and easily so that spills do not contaminate the soil or the water table for any significant period of time; and (3) does not interfere in any significant way with natural biodegradation processes.

It also is becoming more desirable to replace non-renewable resources with renewable resources, particularly given the undesirability of dependence on petroleum-derived products, and there generally is increased demand by the industrial and retail markets for all-natural products. This is due, at least in part, from the attention paid to the long-term effects of materials and their degradation by-products.

SUMMARY

At least one aspect of the present invention seeks to address the need for electrical equipment using an insulating liquid that is non-toxic, biodegradable, relatively inflammable, innocuous to the environment, conforms to existing specifications and guides for dielectric fluids, and exhibits performance characteristics that are comparable with, or superior to, presently used insulating oils.

In one aspect, the present invention provides a dielectric fluid suitable for use in electrical equipment. The dielectric fluid comprises an oil component comprising one or both of crambe oil and high erucic acid rapeseed (HEAR) oil and one or both of esterified or transesterified (which terms are used interchangeably herein) crambe oil and HEAR oil. Some embodiments of the present inventions have oil components with a erucic acid content of at least 45 wt %, at least 50 wt %, at least 55 wt %, or at least 60 wt %.

Another aspect of the invention provides devices for transforming, generating, and/or distributing electrical energy, including electrical transmission cables, switching gear and transformers, that incorporate a dielectric fluid comprising an oil component comprising one or both of crambe oil and HEAR oil and one or both of esterified or transesterified crambe oil and HEAR oil.

As used in this invention:

"Erucic acid" means a monounsaturated fatty acid designated as C22:1.

"High erucic acid oil" means oil containing at least one of crambe oil, HEAR oil, esterified crambe oil, and esterified HEAR oil.

An advantage of at least one embodiment of the present invention is that it provides a dielectric oil having a low viscosity, which improves thermal conductivity.

Another advantage of at least one embodiment of the present invention is that it is biodegradable.

Another advantage of at least one embodiment of the present invention is that, because high erucic acid oils are generally not edible, using these oils to make dielectric fluids does not divert these oils from being used as a food source.

The above summary of the present invention is not intended to describe each disclosed embodiment or every implementation of the present invention. The Figures and detailed description that follow below more particularly exemplify illustrative embodiments.

DETAILED DESCRIPTION

The following is a detailed description of the preferred embodiments. It is to be understood that other embodiments may be used, and structural or logical changes may be made without departing from the scope of the present invention. The following detailed description, therefore, is not to be taken in a limiting sense, and the scope of the invention is defined by the appended claims.

In some embodiments of the present invention, the oil component may comprise at least 45 wt % erucic acid, at least 50 wt % erucic acid, at least 55 wt % erucic acid, or at least 60 wt % erucic acid. This is ideal for use in electrical applications. Some vegetable oil currently used in electrical applications contain oleic acid (C18.1) as their major component. Because of its longer carbon chain, erucic acid provides better thermal stability and resistance than oleic acid.

In at least one embodiment, the high erucic acid oil of the present invention contains higher than 76 wt % of mono-unsaturated fatty acids. Mono-unsaturated fatty acids are more thermally stable than di- and tri-unsaturated fatty acids and are, therefore, better suited for use in insulating fluids in electrical applications.

The esters that are made from the crambe or HEAR oil provide excellent electrical resistance, making them also ideal for use in electrical applications. The esterification or transesterification reaction preferably results in an alkyl ester having a carbon chain of 1 to 8 carbons, more preferably 1 to 4 carbon atoms. Further, because the glycerol unit is removed during esterification, thereby providing individuated carbon chains, the esters have a low viscosity. The low viscosity can improve the oil cooling process during utilization in electrical applications. The viscosity of a vegetable oil can be two times higher than mineral oil, which has been used more prevalently for electrical applications than vegetable oils. Because of their higher viscosity, the vegetable oils may require a different cooling process than mineral oil and can negatively impact the life of electrical equipment, such as a transformer. Including the esters of the present invention in the composition of the dielectric fluid can reduce the viscosity of the oil component to an acceptable level.

To obtain the high erucic acid oils suitable for use in the present invention, oil is first extracted from crambe or HEAR seeds. A typical extraction process includes the use of hexane as a solvent to increase the amount of oil removed from the seeds.

As with other vegetable oils, unrefined crambe and HEAR oils are typically unsatisfactory for use as a dielectric fluid because they contain water and other conductive contaminants which degrade their performance properties as a dielectric fluid when used in electrical apparatus such as power and distribution transformers. Therefore, preferably the crambe and HEAR oils of the present invention are subjected to purification processes to remove water, acid, and conductive contaminants.

Removal of polar contaminants including pigments (e.g., chlorophylls), wax, and phospholipids such as lecithin may be conducted in which phosphoric or citric acid, phospholipid enzymes, silicates, such as metal or sodium silicates, or clays are added to the oil. A suitable amount of such materials is typically about 3-4 wt %. These materials typically agglomerate the contaminants into particles. The particles can them be removed by filtration. A suitable filtration medium typically removes particles in the range of 0.5 to 5 micrometers. Finer pore sized media are typically preferred.

Removal of polar contaminants may also be accomplished by eluting the dielectric fluid composition under gravity through adsorption media including, but not limited to, Fuller's earth, diatomaceous earth, activated clays, and attapulgite.

Removal of water may be effected with known dehydration processes. Suitable examples of dehydration processes include, but are not limited to, eluting the dielectric fluid composition under gravity through adsorption media, centrifugal separation, and vacuum dehydration. Suitable adsorption media to remove water include, but are not limited to, chemical desiccants such as silica gel or anhydrous magnesium sulphate, starch or molecular sieves. Preferably the water concentration is reduced to about 100 ppm or less.

Removal of acids may be effected by the addition of sodium or potassium hydroxide in an alkaline water based solution. This process forms soaps that can be filtered from the oil. Clays may also be used to improve the separation of the soaps from the oil.

The crude crambe and HEAR oils may undergo one or more purification processes to provide a dielectric fluid composition with the desired performance characteristics for use in electrical equipment.

The crambe and HEAR oils may also undergo an esterification process. The esterification or transesterification reaction preferably results in an alkyl ester having a carbon chain of 1 to 8 carbons, more preferably 1 to 4 carbon atoms. Known esterification methods include the use of base or acid catalysts. Typical examples of the base catalyst comprise sodium hydroxide, potassium hydroxide, sodium alkoxides, potassium alkoxides, alkali metal alkoxylate catalysts selected from the group consisting of sodium methanolate, sodium ethanolate, sodium propanolate, sodium butanolate, potassium methanolate, potassium ethanolate, potassium propanolate, potassium butanolate and mixtures thereof, triethanolamine, and mixtures thereof. Typical examples of the acid catalyst comprise inorganic acid catalysts selected from the group consisting of sulfuric acid, phosphoric acid, hydrochloric acid, or mixtures thereof.

The esterified oils may be purified in the same manner as the crude oils.

Other types of vegetable oils and esters may be mixed with the crambe and HEAR oils and esters. Preferred oils would be those having relatively high levels of erucic acid, such as other types of rapeseed oils, wallflower seed oil, meadowfoam seed oil, and mustard seed oil but other vegetable or non-vegetable oils may also be suitable additives in some embodiments.

In some embodiments of the invention the dielectric fluid composition is further blended with additives such as anti-oxidants and metal scavengers (corrosion inhibitors). The oxidative stability of the dielectric fluid composition can be improved by addition of anti-oxidants and/or metal scavengers to the dielectric fluid composition.

Anti-oxidants comprise one or more compounds that absorb, or scavenge, oxygen that otherwise would dissolve in the high erucic acid oils and result in oxidative breakdown of the oil. Suitable examples of anti-oxidants include, but are not limited to, phenolic anti-oxidants such as IRGANOX L109, IRGANOX L64, IRGANOX L94, and octylated/butylated diphenylamine antioxidants such as IRGANOX L57 (all available under these trade names from Ciba Corporation (now part of BASF), Tarrytown, N.Y.), ETHANOX 4702 (available from Albemarle Corporation, Baton Rouge, La.) BHA (butylated hydroxyanisole), BHT (butylated hydroxytoluene), TBHQ (tertiary butylhydroxyquinone), THBP (tetrahydroxybutrophenone), ascorbyl palmitate (rosemary oil), propyl gallate, and alpha-, beta- or delta-tocopherol (vitamin E).

Suitable examples of metal scavengers include, but are not limited to, copper scavengers such as tolutriazole, benzotriazole, and triazole derivatives such as those available under the trade designations IRGAMET 30 (a triazole derivative), and IRGAMET 39 (a tolutriazole derivative) from Ciba Corporation (now part of BASF).

A suitable example of a blend containing an antioxidant and metal scavenger is KEMIN BF 320 (available from Kemin Industries, Des Moines, Iowa), which contains the chain-breaking antioxidant tert-Butylhydroquinone (TBHQ) and the metal chelator citric acid.

The performance of dielectric fluids at low temperatures is important in some applications. The crambe and HEAR oils may have pour point values higher than are desirable for some applications. For example, a typical electrical power distribution application requires that a coolant have a pour point below about −20° C.

Low temperature characteristics typically improve upon the addition of the crambe and/or HEAR esters to the crambe and/or HEAR oils. Blends of these components can provide lower pour points than their individual constituent oils because crambe and HEAR esters have a lower pour point than the crambe or HEAR oil alone. Examples of suitable blend proportions include anywhere from a blend of about 1 to about 99 wt % crambe and/or HEAR oil with about 99 to about 1 wt % crambe and/or HEAR esters, depending on the properties desired. Examples of blends suitable for some applications include about 5 to about 95 wt % crambe and/or HEAR oil with about 95 to about 5 wt % crambe and/or HEAR esters and about 30 to about 70 wt % crambe and/or HEAR oil with about 70 to about 30 wt % crambe and/or HEAR esters. It will be understood that these blend ranges are not exhaustive and are offered merely to illustrate the nature of the invention. Pour point depressants may also be added to the high erucic acid oils of the present invention. A suitable pour point depressant is di-octyl amilate, available from 3M Company, St. Paul, Minn.

The dielectric fluids of the invention preferably are introduced into the electrical equipment in a manner that minimizes the exposure of the fluid to atmospheric oxygen, moisture, and other contaminants that could adversely affect their performance. A suitable process includes drying of the tank contents, evacuation and substitution of air with dry nitrogen gas, filling under partial vacuum, and immediate sealing of the tank.

The dielectric fluids of the invention may be used in any application into which conventional dielectric fluids are employed. Thus, the high erucic acid oil based fluids of the invention may be incorporated into all types of electrical equipment, including, but not limited to, reactors, switchgear, regulators, tap changer compartments, high voltage bushings, and oil-filled cables.

Electrical transformers and switchgear typically are constructed by immersing the core and windings and other electrical equipment in a dielectric fluid and enclosing the immersed components in a sealed housing or tank. The windings in larger equipment frequently are also wrapped with a cellulose or paper material.

The dielectric fluids of the invention can be used to fill new electrical equipment in the manner described above. The fluids can also be used to retrofill existing electrical equipment that use other, less desirable dielectric fluids. Retrofilling existing equipment can be accomplished using any suitable method known in the art, though because of the increased sensitivity of vegetable oil fluids to moisture, it is preferable to dry components of the electrical equipment prior to the introduction of the high erucic acid oil based dielectric fluid.

EXAMPLES

The following examples and comparative examples are offered to aid in the understanding of the present invention and are not to be construed as limiting the scope thereof. Unless otherwise indicated, all parts and percentages are by weight. The listed test methods and protocols were employed in the evaluation of the illustrative example that follows:

Materials List

| Ingredient | Product Name | Source |
|---|---|---|
| HEAR Oil | HEAR Oil | Technology Crops International, Winston-Salem, NC |

-continued

| Ingredient | Product Name | Source |
|---|---|---|
| Soluble Sodium Silicate | PQ D | PQ Corporation, Valley Forge, PA |
| Refining Clay (bleaching adsorbent) | PURE-FLO B80 Natural | Oil-Dri Corporation, Chicago IL |
| Crambe Esters | Experimental Material | 3M Brazil, Riverao Preto, Brazil |
| Antioxidant | ETHANOX 4702 | Albemarle, Baton Rouge, LA |
| Antioxidant and Metal-ion Scavenger | KEMIN BF 320 | Kemin Industries, Des Moines, IA |
| Metal-ion Scavenger | IRGAMET 39 | CIBA - Basel, Switzerland |

Test Methodologies

Specific Gravity—ASTM D1298 (2005)
Flash Point and Fire Point—ASTM D92 (2005)
Pour Point—ASTM D 97 (2009)
Kinematic Viscosity—ASTM D445 (2009)
60 Hz Dissipation Factor—ASTM D924 (2008)
Sulfur Corrosivity—ASTM D1275 (2006)
Acid Number—ASTM D974 (2008)
Water Content—ASTM D1533 (2005)

Refining HEAR Oil

In a 1-liter reactor, 0.4% by mass Sodium Silicate was added to the HEAR Oil. The mixture was continuously stirred at 750 rpm at a temperature of 80-85° C. for 30 minutes under a blanket of Low Water Content Nitrogen.

Refining Clay was then added at 0.4% by mass. The mixture was again continuously stirred at 750 rpm at a temperature of 80-85° C. for 30 minutes under a blanket of Low Water Content Nitrogen.

The mixture was then filtered at room temperature using a lab-made filter cartridge which consisted of a plastic tube equipped with a fitting at the bottom to hold the filter medium, a filter having nominal particle removal in the 0.5-5.0 micrometer range, available under the trade designation ZETA PLUS S SERIES 05S Grade, from CUNO, a 3M company. Compressed air at a pressure in the range 10-30 psi (69 kPa-207 kPa) was used to facilitate the flow of oil through the filter medium.

The filtered oil was then subjected to vacuum of about −30 mmHg (−4 kPa) at a temperature of 70-80° C. for about 36 hours.

Refining Crambe Esters

The Crambe Esters were mono-esters obtained from the transesterification reaction of crambe oil with an alcohol blend of C5-C8 alcohols.

The same process described above for refining the HEAR Oil was used on the Crambe Esters.

Example 1

Blending HEAR Oil with Crambe Esters (95 wt %-5 wt %)

The refined HEAR Oil was blended with the refined Crambe Esters at a ratio 95:5 wt % for HEAR oil to crambe esters.

The antioxidants and metal-ion scavengers ETHANOX 4702, KEMIN BF 320, and IRGAMET 30 were then added at concentrations of 3000, 500, and 50 ppm, respectively, under agitation at a temperature of 70-80° C.

The oil was then stored under vacuum of about −30 mmHg (−4 kPa) at a temperature of about 70° C. for at least 12 hours prior to testing. The test results are shown in the following Table 1.

TABLE 1

| Property | Units | Value |
|---|---|---|
| Specific Gravity | N/A | 0.91 |
| Flash Point | ° C. | 313 |
| Fire Point | ° C. | 340 |
| Pour Point | ° C. | −18 |
| Kinematic Viscosity | cSt | |
| at 98° C. | | 10 |
| at 40° C. | | 42 |
| at 0° C. | | 261 |
| 60-Hz Dissipation Factor | % | |
| at 25° C. | | 0.1 |
| at 100° C. | | 1.4 |
| Sulfur Corrosivity | N/A | NOT Corrosive |
| Acid Number | (mg KOH)/(g oil) | 0.02 |
| Water Content | ppm | 50 |

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. This application is intended to cover any adaptations or variations of the preferred embodiments discussed herein. Therefore, it is manifestly intended that this invention be limited only by the claims and the equivalents thereof.

What is claimed is:

1. A composition comprising:

a dielectric fluid comprising an oil component, the oil component comprising one or both of crambe oil and high erucic acid rapeseed oil and one or both of esterified crambe oil and esterified high erucic acid rapeseed oil, wherein the oil component has a erucic acid content of at least 45 wt %.

2. The composition of claim 1 wherein the oil component has a erucic acid content of at least 50 wt %.

3. The composition of claim 1 wherein the oil component has a erucic acid content of at least 55 wt %.

4. The composition of claim 1 wherein the oil component has a erucic acid content of at least 60 wt %.

5. The composition of claim 1 further comprising an antioxidant.

6. The composition of claim 1 further comprising a metal scavenger.

7. The composition of claim 1 wherein the oil comprises at least 76 wt % mono-unsaturated fatty acids.

8. The composition of claim 1 wherein the oil comprises about 70 to about 95 wt % of one or both of crambe and high erucic acid rapeseed oil and about 30 to about 5 wt % of one or both of esterified crambe oil and esterified high erucic acid rapeseed oil.

9. The composition of claim 1 wherein the oil comprises about 95 wt % of one or both of crambe and high erucic acid rapeseed oil and about 5 wt % of one or both of esterified crambe oil and esterified high erucic acid rapeseed oil.

10. An article comprising:

electrical equipment containing a dielectric fluid comprising an oil component, the oil component comprising one or both of crambe oil and high erucic acid rapeseed oil and one or both of esterified crambe oil and esterified high erucic acid rapeseed oil, wherein the oil component has a erucic acid content of at least 45 wt %.

11. The article of claim 10 wherein the oil component has a erucic acid content of at least 50 wt %.

12. The article of claim 10 wherein the oil component has a erucic acid content of at least 55 wt %.

13. The article of claim 10 wherein the oil component has a erucic acid content of at least 60 wt %.

14. The article of claim 10 further comprising one or both of an antioxidant and a metal scavenger.

15. The article of claim 10 wherein the oil comprises at least 76 wt % mono-unsaturated fatty acids.

16. The article of claim 10 wherein the oil comprises about 70 to about 95 wt % of one or both of crambe and high erucic acid rapeseed oil and about 30 to about 5 wt % of one or both of esterified crambe oil and esterified high erucic acid rapeseed oil.

17. The article of claim 10 wherein the oil comprises about 95 wt % of one or both of crambe and high erucic acid rapeseed oil and about 5 wt % of one or both of esterified crambe oil and esterified high erucic acid rapeseed oil.

18. The article of claim 10 wherein the electrical equipment is a transformer.

* * * * *

UNITED STATES PATENT AND TRADEMARK OFFICE

CERTIFICATE OF CORRECTION

PATENT NO. : 8,790,553 B2
APPLICATION NO. : 13/382416
DATED : July 29, 2014
INVENTOR(S) : Lopes et al.

It is certified that error appears in the above-identified patent and that said Letters Patent is hereby corrected as shown below:

Title Page,

Column 1, Other Publications
Page 2, Line 1, Delete “Zn/l2” and insert -- Zn/I2 --, therefor.

Column 2, Other Publications
Page 2, Line 20, Delete “AlChE” and insert -- AIChE --, therefor.

In the Specification,

Column 4
Line 47, Delete “butylhydroxyquinone),” and insert -- butylhydroquinone), --, therefor.

Signed and Sealed this
Eleventh Day of November, 2014

Michelle K. Lee

Michelle K. Lee
*Deputy Director of the United States Patent and Trademark Office*